DIGITAL COUNTER TRAFFIC SIGNAL CONTROLLER

Filed Dec. 30, 1963 3 Sheets-Sheet 1

INVENTOR.
A. W. WETMORE
BY
[signature]
HIS ATTORNEY

INVENTOR.
A.W.WETMORE
BY
Forest B. Hitchcock
HIS ATTORNEY

INVENTOR.
A. W. WETMORE
BY Forest B. Hitchcock
HIS ATTORNEY

United States Patent Office 3,302,169
Patented Jan. 31, 1967

3,302,169
DIGITAL COUNTER TRAFFIC SIGNAL CONTROLLER

Arthur W. Wetmore, Rochester, N.Y., assignor to General Signal Corporation, Rochester, N.Y., a corporation of New York Filed Dec. 30, 1963, Ser. No. 334,314
4 Claims. (Cl. 340—41)

This invention relates to a digital counter circuit and, more particularly, pertains to such a circuit comprised of a plurality of solid-state devices and in which each different digital count is completed upon concurrent operation of all such solid-state devices.

In conventional digital counters, it is usual to operate sequentially through a plurality of devices to a particular device which corresponds to the selected digital count. In this operation, all of the devices are normally in an off or deenergized condition and are sequentially operated to energized conditions to produce an output corresponding to the selected count. Such devices may take the form of relays, electronic tubes, solid-state devices etc. However, in this type of operation, each of the plurality of devices must be selectable corresponding to its allotted count to provide an output for indicating that the digital counter has arrived at the selected count.

It is proposed in the present invention to provide a digital counter circuit comprised of a plurality of solid-state devices which are operated concurrently for each selected count to provide an output from a single solid-state device upon completion of the selected count by such digital counter circuits. More specifically, it is proposed to provide in the digital counter circuit a multi-aperture ferrite core for each of the solid-state devices where each such core is allotted to a particular digital count. Normally, all of the plurality of cores are operating, i.e., all of the cores are in a set condition. The application of a given count input to the plurality of cores operates to clear a particular number of cores including the single multi-aperture core which occupies the first operative position in the operative positioning of the cores, one relative to the others. A pulsing source couples prime and drive pulses in sequence to all cores except the single core so as to operate the cores to set conditions in sequence starting with the core to which is allotted the highest digital count corresponding to the selected count input. The single core is the last core operated to its set condition for any given number of cores which permits such single core to provide an output which is indicative of the completion of the count according to the input count selection.

One area in which a digtal counter of the type disclosed herein is employable is a highway traffic signal controller in which each of the portions of the traffic signal cycle is timed. Such time measurement for all portions of the traffic signal cycle by the traffic signal controller is more commonly referred to as "pre-timed" control.

In known digital counters in which a single bit is shifted through the counter for counting purposes, it is known that a malfunction could cause the counter to lose the single bit being shifted and therefore the total count. In highway traffic signal controllers employing digital counting, it is highly desirable to accurately count the different portions of the traffic signal cycle so as to expeditiously move traffic through the intersection. However, the loss of the single bit during counting for any portion of the traffic cycle period may excessively increase the time allotted to the portion of the traffic signal cycle during which the digital counter is operating. The digital counter of the present invention, by contrast, counts according to an input count selection to provide an output from a single core for each different count as may be required in a highway traffic signal controller. Where a plurality of digital counters are employed, an output from a single core is provided for each digital counter with gating means for determining coincidence of outputs. The feature of using a single core output from one or more digital counters for each different count made on the digital counters minimizes the possibility of unduly extending any particular portion of the traffic signal cycle.

Thus, one object of this invention is to provide an all solid-state digital counter for counting a plurality of different numbers and in which the completion of count by the digital counter occurs upon operation of a single solid-state device.

Another object of this invention is to provide a digital counter in which all of the counting elements are normally operating and a portion of which are rendered inoperative according to a count input selection with a count output being provided by the digital counter upon completion of operation of all such counting elements previously rendered inoperative.

Another object of this invention is to provide in a highway traffic signal controller a digital counting means including a plurality of digital counters for counting the different portions of a traffic signal cycle and in which the measurement of each such portion is terminated upon completion of operation of all counting elements in the digital counters.

Another object of this invention is to provide a highway traffic signal controller employing digital timing for efficiently and accurately timing the different successive portions of traffic signal cycle.

Other objects, purposes and characteristic features of the present invention will be in part obvious from the accompanying drawings and will in part be pointed out as the description of the invention progresses.

In the description of the invention which follows, reference will be made to the accompanying drawings in which.

Figure 1:
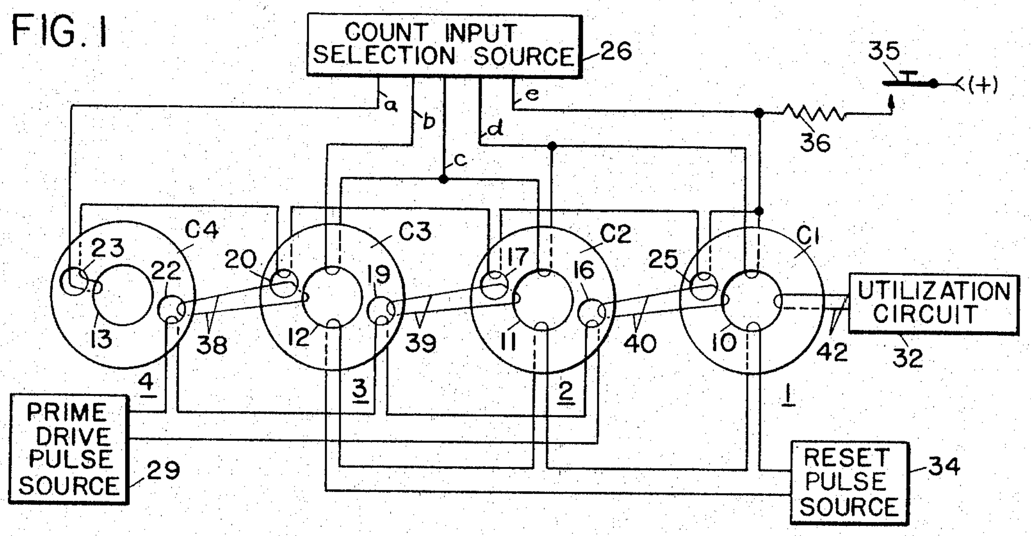
FIG. 1 illustrates diagrammatically one embodiment of the digital counter circuit employing multi-aperture cores.

Referring now to FIG. 1, an abbreviated digital counting circuit is illustrated which includes multi-aperture ferrite cores C1–C4. Cores C1–C4 correspond respectively to counts 1–4 as indicated by the numerals 1–4. Cores C1–C4 include respective major apertures 10–13. Each of the cores C2–C4 includes two minor apertures, these minor apertures being designated 16–17 for core C2, 19–20 for core C3 and 22–23 for core C4. Core C1 includes a single minor aperture 25.

A count input selection source 26 is coupled to each of the cores C1–C4. More specifically, count input selection source 26 is coupled to major apertures 10–12 of cores C1–C3 and receiving minor apertures 25, 17, 20 and 23 of cores C1–C4 respectively. Count input selection source 26 operates to provide an output pulse on each of the coupling wires *b–e* for the purpose of clearing certain of the cores C1–C4 according to the digital count to be counted. Wire *a* is a return lead coupled to, for example, ground.

A prime-drive pulse source 29 is coupled to transmitting minor apertures 16, 19 and 22 of cores C2–C4 for supplying prime and drive pulses in sequence to such cores C2–C4 for the purpose of transferring operation between the last operated core to the next core. In this connection, each of the minor apertures 16, 19 and 22 of cores C2–C4 respectively is coupled to a minor aperture of an adjacent core, these minor apertures being respectively 25, 17 and 20 of cores C1–C3. Each such coupling arrangement may be referred to as transfer coupling and is provided for the purpose of transferring operation from the operating core to an adjacent core upon occurrence of the prime and drive pulse pair which are supplied to a selected rate.

The major aperture 10 of core C1 is coupled to a utilization circuit 32 which is operative by pulses received from core C1 as it is rendered operative for indicating completion of a count corresponding to the input count selection.

The major apertures 10–12 of cores C1–C3 are serially coupled to a reset pulse source 34 which may be provided for the purpose of initially operating the cores C1–C3 or in the case of a possible malfunction.

In operation, core C4 is initially operated to its set condition by operation of manual button 35. More specifically, actuation of button 35 to its closed position couples (+) energy through a current limiting resistor 36 and the receiving minor apertures 25, 17, 20 and 23 of cores C1–C4 respectively and to ground (not shown) in count input selection source 26 over wire *a*. The current flows through the winding coupled to major aperture 13 and minor aperture 23 of core C4 to cause a flux path in core C4 and around the portion of minor aperture 22 into which is threaded transfer winding 38. In this connection, each of the cores C1–C3 has a flux path established therein by such (+) energy, but these flux paths do not include the portion of the transmitting minor apertures including the transfer windings. Upon release of button 35, core C4 remains in its set condition indefinitely. It is to be understood here that as many cores as may be required in the digital counter may be provided each of which is serially connected with cores C1–C3, so as to increase the possible counting capacity of the digital counting circuit to nine, for example. Where, for example, the digital counter circuit of FIG. 1 is employed as a units counter having ten cores in combination with a tens counter having ten cores, a pulse of energy is coupled from reset pulse source 34 and through the major apertures of the first nine cores in the units counter to operate such cores to their clear conditions for each count on the tens counter. In this manner, a count of "9" is made by the units counter prior to making a count on the tens counter.

The digital counter of FIG. 1 may also be operated to count digits 1, 2 or 3 depending upon the input applied to wires *b*, *c* and *d* from count input selection source 26. If, for example, it is assumed to count the digit 3, a positive (+) energy pulse is coupled over wire *b* from count input selection source 26 and through major apertures 10–12 of cores C1–C3 respectively and through the circuit including receiving minor apertures 25, 17, 20 and 23 of cores C1–C4 respectively and over wire *a* to ground. It is suggested here that in each case the windings coupling major apertures 10–12 of cores C1–C3 respectively with respect to the windings coupling respective minor apertures 25, 17 and 20 of cores C1–C3 have a turns ratio such that each of the cores C1–C3 is operated to its clear condition. In this connection, the number of cores cleared is dependent upon the wire *b–d* to which is applied a positive (+) energy pulse.

Prime and drive pulse source 29 supplies prime and drive pulses opposite in character to cores C2–C4 connected serially to such source 29. Following clearance of cores C1–C3, a first occurring prime pulse from prime-drive pulse source 29 slowly switches the flux around minor aperture 22 of core C4 to a set direction. The drive pulse then reverses the direction of flux around minor aperture 22 of core C4 causing a current to be induced into coupling winding 38 for setting core C3. The next occurring prime pulse switches the flux around minor aperture 19 of core C3 to a set condition. A next drive pulse causes the flux around minor aperture 19 to reverse in direction causing a current to be induced into coupling winding 39 which sets core C2. The next occurring prime pulse switches the flux around minor aperture 16 of core C2 to a set direction. The next occurring drive pulses switches the flux around minor aperture 16 of core C2 in a reverse direction causing a current flow to be induced into coupling winding 40 for setting core C1. Core C1 being set then induces a current flow into coupling winding 42 for activating utilization circuit 32. The transfer of operation from core C4 to core C3, from core C3 to core C2, and from core C2 to core C1 each comprises a count which may be variable in time occurring to the rate of occurrence of the prime pulse and drive pulse combination supplied from prime-drive pulse source 29 for each transference of operation. Cores C1–C3 in addition to core C4 are again in their set conditions and remain therein until a count input is received from count input selection source 26 which causes particular ones of the cores C1–C3 to be cleared according to the selected count input.

Figure 2:
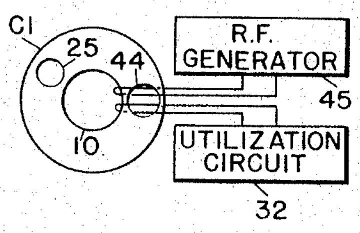
FIG. 2 illustrates diagrammatically an alternate form of deriving an output from the single output multi-aperture core shown in FIG. 1.

FIG. 2 illustrates core C1 of the digital counting circuit shown in FIG. 1 and further includes a transmitting minor aperture 44. An RF generator 45 is coupled to core C1 at its minor aperture 44 for the purpose of providing prime and drive pulses at a frequency, for example, in the order of 200 kilocycles. Utilization circuit 32 is also coupled to core C1 through minor aperture 44 and receives an input each time core C1 is operated to a set condition to provide a continuous output as caused by the prime and drive pulses of RF generator 45.

Figure 3:
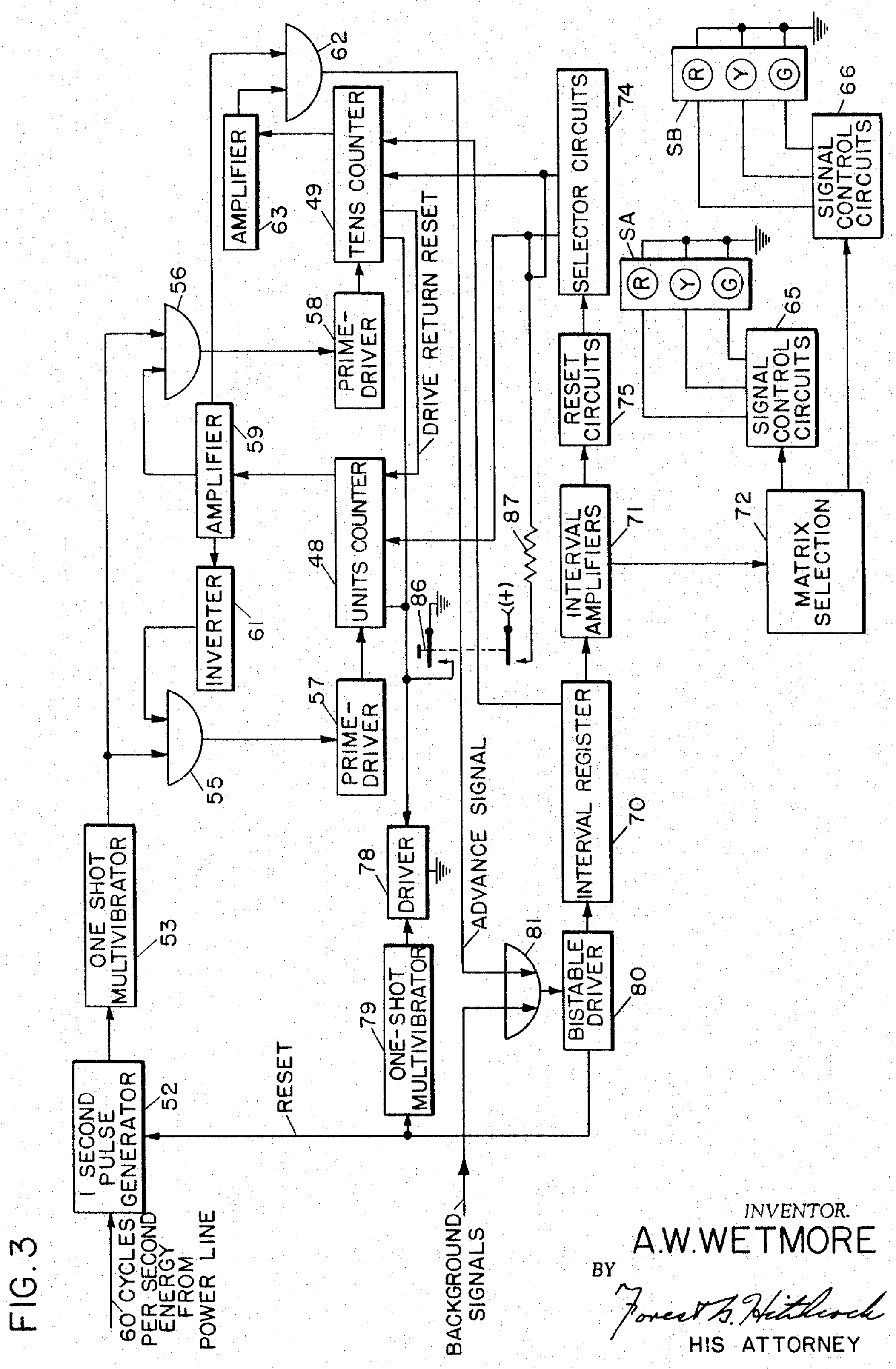
FIG. 3 illustrates in block diagram a highway traffic signal controller in which the digital counter circuit of the present invention is employed.

Referring now to FIG. 3, a highway traffic signal controller of the pre-timed type is shown in block form in which the different portions of a traffic signal cycle are timed by digital counter circuits as disclosed herein. In particular, a units counter 48 and a tens counter 49 are employed in combination to measure each of the different portions of the traffic signal cycle. In the units counter 48 and tens counter 49, it is suggested that ten multi-aperture cores be employed in the manner shown and described for FIG. 1. The units counter 48 and tens counter 49 may then be operated to measure a time interval having a count in seconds as high as 99.

In order that units counter 48 and tens counter 49 operate on a one count per second basis, a one second pulse generator 52 operates to provide a one pulse per second output in response to power line energy coupled to its input at a frequency of 60 cycles per second. Each output pulse of the one second pulse generator 52 is coupled to a one-shot multivibrator 53 causing it to operate from a normal to an abnormal condition wherein it provides an output which is concurrently coupled to AND gates 55 and 56. The output from AND gates 55 and 56 when supplied are employed respectively to operate prime-driver circuits 57 and 58 corresponding respectively to units counter 48 and tens counter 49.

The output of units counter 48 is provided in its zero counting position and coupled to an amplifier 59.

In its normal operating condition, i.e., in the absence of the output from units counter 48 in its zero counting position, amplifier 59 couples an input to inverter 61 provided for a purpose of inverting such input and further coupling such inverted input to AND gate 55. In the presence of such inverted input to AND gate 55, the successive outputs of one-shot multivibrator 53 are coupled to prime-driver circuit 57 for driving units counter 48.

Each operation of units counter 48 to its zero counting position causes units counter 48 to couple its output to amplifier 59 for operating it from its normal operating condition to an abnormal operating condition. In such abnormal operating condition, an output is coupled from amplifier 59 to AND gate 56 to render it effective to provide an output for each output of one-shot multivibrator 53 coupled thereto. Each output of AND gate 56 is coupled to prime-driver circuit 58 for the purpose of advancing tens counter 49. Tens counter 49 may be operated, for example, from a count of "9" back to a zero counting positon in the manner described for FIG. 1 according to the application of a selected count input thereto as will be described more fully hereinafter.

The concurrent operation of units counter 48 and tens counter 49 to their respective zero counting positions causes an AND gate 62 to provide an output for the purpose of advancing the traffic signal controller to a different portion of a traffic signal cycle. In this connection, amplifier 59 couples its output to AND gate 62 upon receiving an input from units counter 48 in its zero counting position and amplifier 63 couples its output to AND gate 62 upon receiving an input from tens counter 49 in its zero counting position causing AND gate 62 to provide an ADVANCE SIGNAL output for advancing the traffic signal controller to its next interval.

The traffic signal controller of FIG. 3 includes normal proceed, stop and caution indications designated G, Y and R for each of two directions of traffic movement through an intersection. For example, the two directions of traffic movement through an intersection may be referred to as phase A and phase B with traffic signal SA being employed to direct traffic movement through the intersection on phase A, and traffic signal SB being employed to direct traffic movement through the intersection on phase B. The operation of traffic signals SA and SB is controlled according to the operation of respective signal control circuits 65 and 66. Signal control circuits 65 and 66 are controlled for the different portions of the traffic signal cycle in a specific manner to operate the signal indications for phase A and phase B according to the portion of the traffic signal cycle for which the traffic signal controller is then operating. The different portions of the traffic signal cycle are defined by the operation of an interval register 70. More specifically, interval register 70 includes, for example, a plurality of multiaperture core circuits (not shown) each when operating for defining a different portion of the traffic signal cycle such as shown and described in the pending application Ser. No. 308,597 filed on September 12, 1963 by N. A. Bolton which application is assigned to the assignee of the present invention.

Each core circuit operation for interval register 70 provides an output to operate an interval amplifier corresponding to that core included with interval amplifiers 71. The individual interval amplifier operated couples an output through a matrix selection 72 to signal control circuits 65 and 66 to operate such circuits in a manner to cause signals SA and SB to operate according to the portion of the traffic signal cycle allotted to the operating core of interval register 70.

A time period is measured for each of the different portions of the traffic signal cycle according to electrical connections selectively made in selector circuits 74. More specifically, it is contemplated that selector circuits

74 includes a selective connection for coupling each of nine cores (not shown) for each of units counter 48 and tens counter 49 to a separate reset circuit in reset circuits 75 which is operated by the interval amplifier in interval amplifiers 71 corresponding to a particular core in interval register 70. The purpose of coupling a reset circuit to each of units counter 48 and tens counter 49 for each core in interval register 70 is to couple a count input selection to units counter 48 and tens counter 49 upon operation of a core in interval register 70 which defines a different portion of the traffic signal cycle. Certain of the included cores in units counter 48 and tens counter 49 are then operated to clear conditions simultaneously in the manner described with reference to the digtal counter circuit of FIG. 1. Such cleared cores are then operated to set conditions on a one-core-per-second basis in order to measure the time interval for the portion of the traffic cycle defined by the operating core in interval register 70.

For each operating core of interval register 70 its output is coupled to interval amplifiers 71 and more specifically to an interval amplifier corresponding to that core. The corresponding interval amplifier operates to provide an output which is coupled to reset circuits 75 and more specifically a pair of reset circuits, one corresponding to each of units counter 48 and tens counter 49. Each reset circuit in reset circuits 75 is coupled to units counter 48 or tens counter 49 through a selection made in selector circuit 74 for selecting the cores therein which are reset or cleared upon operation of the corresponding core in interval register 70.

In operation, each interval amplifier in interval amplifiers 71 which corresponds to an operating core activates its corresponding reset circuits in reset circuits 75 which operate to reset or clear the cores in units counter 48 and tens counter 49 according to selections made in selector circuit 74 as soon as driver circuit 78 becomes operative. In this connection, a one-shot multivibrator 79 is operated in response to an ADVANCE SIGNAL provided upon concurrent operation of units counter 48 and tens counter 49 to their zero counting positions. More specifically, one-shot multivibrator 79 operates from its normal condition to its abnormal condition of operation in response to an output from bistable driver 80 upon reception of the ADVANCE SIGNAL through OR gate 81. One-shot multivibrator 79 remains in its abnormal condition of operaton in the order of ten microseconds following which it operates to its normal condition of operation. Upon return to its normal condition of operation, an output is coupled from one-shot multivbrator 79 to driver circuit 78 for rendering driver circuit 78 operative. Units counter 48 and tens counter 49 being in their zero counting positions are then reset to counting positions according to the selections made in selector circuits 74 and the operation of a successive core in interval register 70. In this connection, bistable driver 80 couples an output to interval register 70 upon reception of the ADVANCE SIGNAL for advancing interval register 70 from its then operating core to its next successive core.

During measurement of each time interval corresponding to a different portion of the traffic signal cycle, units counter 48 is reset each time tens counter 49 is advanced a count. In this connection, the output of prime-driver circuit 58 is coupled through tens counter 49 for the purpose of advancing tens counter 49 by rendering the next core operative and at the same time clearing the first nine cores in units counter 48 over the DRIVE RETURN RESET bus. In this manner, units counter 48 is repeatedly operated for a large count such as, for example, a count of "99," while each core in tens counter 49 is only operated once. Tens counter 49 is, however, reset at the time that interval register 70 is advanced in response to an output from bistable driver 80.

In order that the traffic signal controller of FIG. 3 be initially in a zero counting condition, a manual push-button 86 is provided for coupling energy through the cores included with units counter 48 and tens counter 49 in a manner similar to that described for the digital counter of FIG. 1 upon actuation of push-button 35. A current limiting resistor 87 is included in the circuit for limiting current flow through the core windings included with units counter 48 and tens counter 49.

It is contemplated that the traffic signal controller of FIG. 3 be responsive to received background signals communicated from a remote station in the form of conventional offset and split signals. In this connection, the occurrence of, for example, a split signal coupled through OR gate 81 to bistable driver 80 prior to the arrival of the ADVANCE SIGNAL causes interval register 70 to operate from the then operating core to an adjacent core wherein the time interval for a different portion of the traffic signal cycle is measured. This type of operation may occur, for example, during the time that the proceed indication is displayed for phase A while the stop indication is displayed for phase B.

FIGS. 4–7 illustrate detailed circuits which may be employed in the traffic signal controller embodiment of FIG. 3. In this connection, it is understood that the remaining blocks indicated in the drawing of FIG. 3 are either illustrated in the above-mentioned Bolton application Ser. No. 308,597 or are considered as being conventional circuits.

Figure 4:
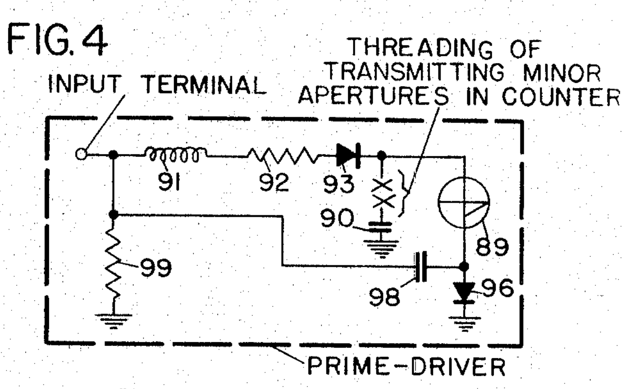
FIG. 4 illustrates in detail a typical prime-driver circuit shown in block form in FIG. 3.

FIG. 4 illustrates the prime-driver circuit such as may be used for prime-driver circuits 57 and 58 shown in the block diagram of FIG. 3. More specifically, the prime-driver circuit illustrated in FIG. 4 includes a four-layer diode 89 which is so chosen as to have a breakdown voltage greater than the input voltage coupled to the INPUT TERMINAL from either AND gate 55 or 56. Four-layer diode 89 is normally cut off, but operates to a conducting conditon in response to concurrent charging of capacitors 90 and 98 in response to an input signal to the INPUT TERMINAL.

Capacitor 90 has a charging circuit including a coil 91 coupled to the INPUT TERMINAL, a resistor 92, a diode 93 and the transmitting minor apertures of the counter with which the prime-driver circuit is employed. Capacitor 98 has a charging circuit including diode 96.

In operation, a positive-going signal coupled to the INPUT TERMINAL causes each of capacitors 90 and 98 to be charged. More specifically, the charging of capacitor 90 causes current to flow through the transmitting minor apertures of the counter with which the prime-driver circuit is employed which current flow acts as a prime signal. Capacitor 90 upon being charged acts as a voltage source which couples a (+) potential to one terminal of four-layer diode 89. Capacitor 98 is charged through diode 96 in response to the positive-going input signal coupled to the INPUT TERMINAL. Capacitor 98 also acts as a voltage source which couples a (−) energy to the opposite terminal of four-layer diode 89. Upon termination of the positive-going input signal, the breakdown voltage of four-layer diode 89 is attained by the respective charges on capacitors 90 and 98 causing four-layer diode 89 to conduct. A series circuit is completed including four-layer diode 89, capacitors 90 and 98, the transmitting minor apertures of the counter with which the prime-driver circuit is employed and resistor 99. In this connection, capacitors 90 and 98 are discharged with current flowing in the opposite direction through transmitting minor apertures in the counter with which the prime-driver circuit is employed providing the drive signal. In this connection, capacitor 90 is considered to be relatively large with respect to capacitor 98 so that capacitor 90 may take a sufficiently long time to discharge to insure that the drive signal is of sufficient duration. Capacitor 90 is completely discharged through four-layer diode 89 and diode 96 after capacitor 98 has been completely discharged.

Figure 5:
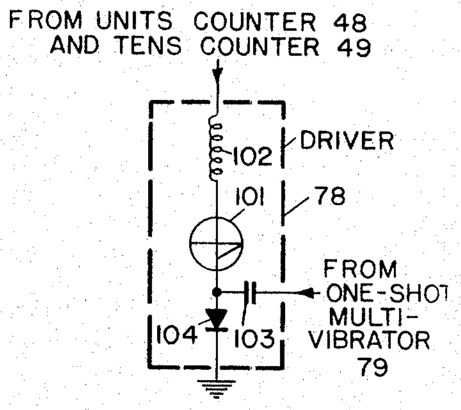
FIG. 5 illustrates in detail the driver circuit shown in block form in FIG. 3.

Turning now to FIG. 5, one embodiment of driver circuit 78 is illustrated. More specifically, driver circuit 78 includes a four-layer diode 101 which is coupled to units counter 48 and tens counter 49 through a coil 102. Four-layer diode 101 is normally cut off and is rendered conductive each time that interval register 70 is advanced in operation from one core to a succeeding core in order that certain of the cores in units counter 48 and tens counter 49 may be reset according to selections made in selector circuits 74 which correspond to the newly-operated core in interval register 70. More specifically, each of the reset circuits in reset circuits 75 corresponding to each core of interval register 70 is activated upon operation of that core. Such activation of the reset circuits provides a positive (+) energy which is coupled to one terminal of four-layer diode 101 through coil 102. Four-layer diode 101 remains cut off, however, until a (−) energy is coupled to its opposite terminal according to the operation of one-shot multivibrator 79 in response to an ADVANCE SIGNAL. Upon occurrence of the ADVANCE SIGNAL, bistable driver 80 operates to provide an output which operates one-shot multivibrator 79 to its abnormal condition of operation. After a short interval, one-shot multivibrator 79 operates from its abnormal condition to its normal condition of operation. During such short interval, a positive-going signal is coupled to driver circuit 78, and more specifically to the opposite terminal of four-layer diode 101 through a capacitor 103. Capacitor 103 differentiates such positive-going signal to provide for the trailing edge thereof a negative (−) energy on the opposite terminal of four-layer diode 101. The breakdown voltage of interval four-layer diode 101 is then reached permitting it to conduct. A circuit is then completed for resetting particular cores in units counter 48 and tens counter 49 as four-layer diode 101 conducts through coil 102 and a diode 104.

Figure 6:
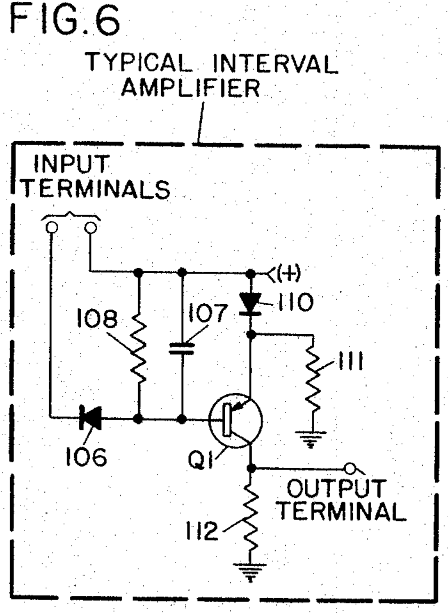
FIG. 6 illustrates in detail a typical interval amplifier illustrated in block form in FIG. 3.

A typical interval amplifier is illustrated in FIG. 6, one of which is provided for each different portion of the traffic signal cycle which is defined by the operation of a multi-aperture core in interval register 70. Each such core includes a readout winding coupled to a minor aperture to which is conducted the INPUT TERMINALS of its corresponding interval amplifier. Each such core when operating provides a negative-going output on its readout winding which is coupled to the base circuit of a P-N-P type transistor Q1 through a diode 106 for causing such transistor to conduct as long as the corresponding core is operated. Capacitor 107 and resistor 108 comprise a biasing circuit for coupling the base of transistor Q1 to the readout winding threading the readout minor aperture. Diode 110 and resistor 111 comprise a biasing circuit for the emitter of transistor Q1. The output of transistor Q1 is taken from the top side of resistor 112 and coupled to the output terminal which is coupled to the corresponding reset circuit in reset circuits 75.

Figure 7:
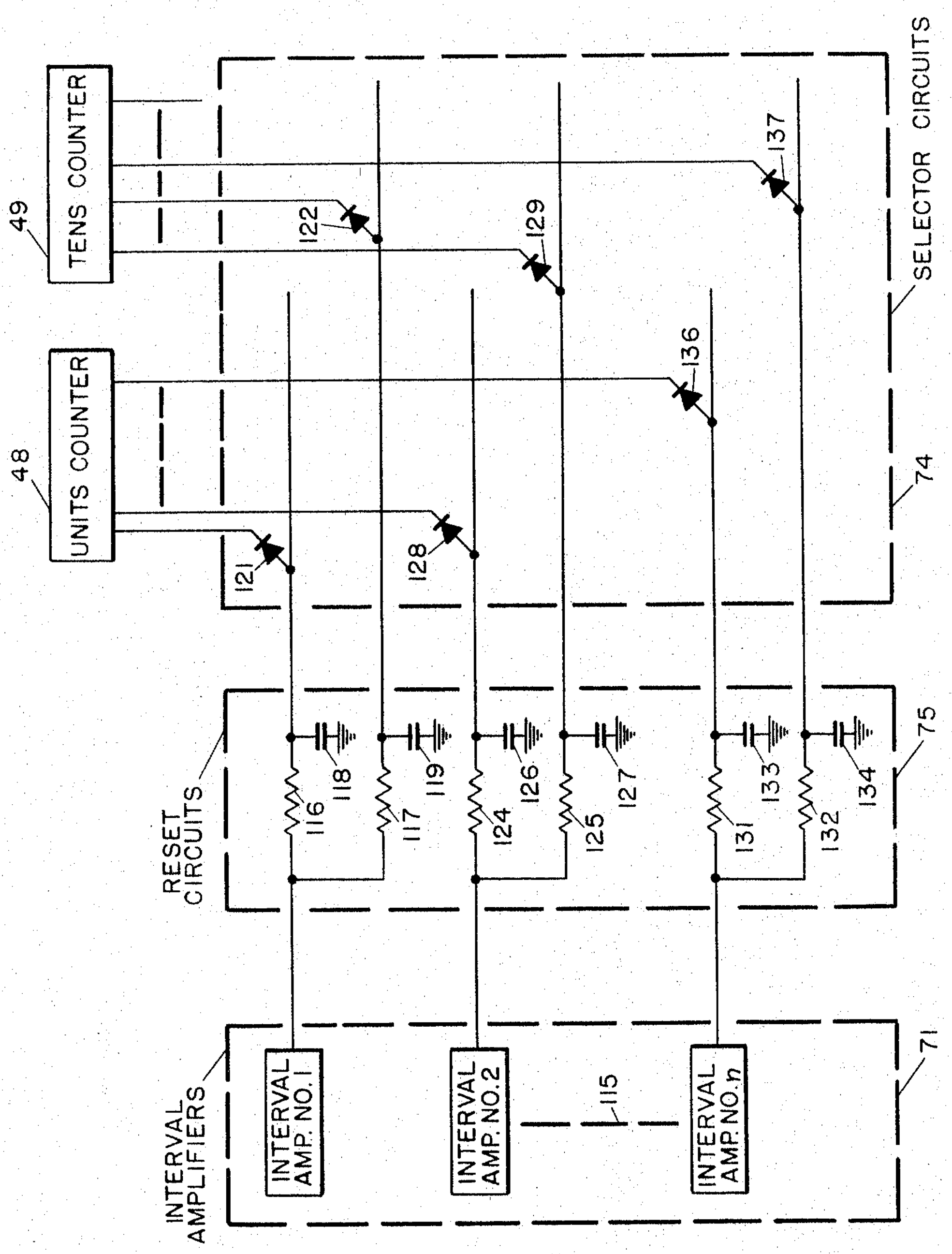
FIG. 7 illustrates in block form and in circuit detail typical circuit connections of the interval amplifiers to the digital units counter and tens counter shown in block form in FIG. 3.

Referring now to FIG. 7, typical illustrations of connections between interval amplifier 71, reset circuits 75 and selector circuits 74 with units counter 48 and tens counter 49 are illustrated in more detail. Interval amplifiers 71 includes in block diagram interval amplifier No. 1, interval amplifier No. 2 and interval amplifier No. *n*. In other words, interval amplifier 71 may include as many interval amplifiers as are necessary to define the different portions of a traffic signal cycle, each interval amplifier being similar to the typical interval amplifier of FIG. 6. Dotted lines 115 are provided to indicate that any number of interval amplifiers may be included between interval amplifier No. 2 and interval amplifier No. *n*. Reset circuits 75 includes a resistor-capacitor combination, while selector circuits 74 includes a diode for coupling the output of each interval amplifier to each of units counter 48 and tens counter 49. For interval amplifier No. 1, the resistor-capacitor combination include resistors 116 and 117 and capacitors 118 and 119 with connecting diodes 121 and 122 for coupling interval amplifier No. 1 to units counter 48 and tens counter 49 respectively. For interval amplifier No. 2, these resistor-capacitor combinations include resistors 124 and 125 and capacitors 126 and 127 with connecting diodes 128 and 129 for coupling interval amplifier No. 2 to units counter 48 and tens counter 49 respectively. For interval amp No. *n*, these resistor-capacitor combinations include resistors 131 and 132 and capacitors 133 and 134 with connecting diodes 136 and 137 for coupling interval amplifier No. *n* to units counter 48 and tens counter 49 respectively.

In operation, each of interval amplifiers Nos. 1, 2 and *n* couples its output to a pair of capacitors in reset circuits 75 through relatively large series connected resistors for charging such capacitors. The charged capacitors corresponding to a particular interval amplifier and its corresponding operating core in interval register 70 provide a combined positive (+) energy signal to one terminal of the four-layer diode 101 in driver 78 as described above. Upon occurrence of the positive-going signal from one-shot multivibrator 79, four-layer diode 101 in driver circuit 78 is rendered conductive to permit selected cores in units counter 48 and tens counter 49 to reset also causing the two capacitors to be partially discharged. Upon operation of interval register 70 from the then operating core to a successive core, the interval amplifier corresponding to that operated core also is cut off. The capacitors corresponding to such interval amplifier are then completely discharged through the interval amplifier as it is cut off.

Assume, for example, the highway traffic signal controller of FIG. 3 is operated in the first portion of a traffic signal cycle. That is, assume that a first core in interval register 70 is operating which has caused interval amplifier No. 1 to operate for charging capacitors 118 and 119 through respective resistors 116 and 117. The charge on capacitor 118 is coupled to one terminal of four-layer diode 101 in driver circuit 78 through diode 121 and selector circuits 74 and through major apertures of certain cores in units counter 48. The charge on capacitor 119 is coupled to one terminal of four-layer diode 101 in driver circuit 78 through diode 122 in selector circuits 74 and the major apertures of certain cores in tens counter 49. It is suggested, for example, that a count of "58" be electronically measured in the first portion of the traffic signal cycle. In other words, upon initial operation of the traffic signal controller in its first portion, the first eight cores (not shown) in units counter 48 are reset, while the first five cores (not shown) in tens counter 49 are reset to clear conditions in the manner described with reference to the digital counter of FIG. 1. Units counter 48 and tens counter 49 are then operated on a one-count-per-second basis as described in order to electronically measure the time period of "58" seconds during which the highway traffic signal controller operates in the first portion of the traffic signal cycle.

Upon termination of such measured time interval, the highway traffic signal controller of FIG. 3 is advanced in the manner described supra to the second portion of the traffic signal cycle in which a core in interval register 70 operates. Upon initial operation of such core, interval amp. No. 2 in interval amplifiers 71 is operated and couples its output to reset circuits 75. Capacitors 126 and 127 corresponding to interval amp. No. 2 are charged by its output through respective resistors 124 and 125. The charge on capacitor 126 is coupled to one terminal of four-layer diode 101 in driver circuit 78 through diode 128 in selector circuit 74 and the major apertures of, for example, the first seven cores in units counter 48. The charge on capacitor 127 is coupled to the same terminal of four-layer diode 101 in driver circuit 78 through diode 129 and the major apertures of, for example, the first eight cores in tens counter 49. Such cores in units counter 48 and tens counter 49 are reset or cleared when four-layer diode 101 is rendered conductive in response to the output of one-shot multivibrator 79 as described supra. In this example, the highway traffic signal controller operates to electronically measure a time interval for the second portion of the traffic signal cycle of "87" seconds. This operation is considered to be typical for each of the other different portions of the traffic signal cycle, the only difference being the selections made in selector circuits 74 which determine the number of cores in units counter 48 and tens counter 49 which are to be reset for each of the different portions of the traffic signal cycle.

Having described a digital counter circuit as a specific embodiment of the present invention and its adaptation in a highway traffic signal controller of the pre-timed type, it should be understood that a specific embodiment illustrated is considered as being merely typical and that various modifications, other adaptations and alterations may be made to the specific form shown without departing from the spirit or scope of this invention.

What I claim is:

1. A controller for controlling the signal indication displayed by traffic signals at the intersection of conflicting rights-of-way comprising in combination, a digital counter, a source of discrete pulses having a predetermined rate for driving said counter, a register having a predetermined number of steps and being operable to each step in turn, signal control means responsive to said register for controlling said signals to display a distinctive combination of signal indications on each step of said register, means responsive to the operation of said register from one step to the next for setting said digital counter to a predetermined count selected in accordance with the particular next step to which said register is operated, and means responsive to the operation of said digital counter to a predetermined end count which is the same for each step of said register for advancing said register to its next successive step.

2. The controller of claim 1 in which said selected count of said digital counter corresponds to a count of zero.

3. The controller of claim 1 in which said digital counter comprises units and tens counting circuits and said counter operates said register to its next step each time that both said counting circuits simultaneously reach a predetermined count.

4. The controller according to claim 1 in which said digital counter includes in combination a first counting means having a plurality of multiaperture cores for successively counting unit counts and a second counting means having a plurality of multiaperture cores for successively counting ten counts, said first counting means and said second counting means being effective when each is in a zero counting condition to provide an output for operating said register to its next step.

References Cited by the Examiner

UNITED STATES PATENTS

| | | | |
|---|---|---|---|
| 2,925,958 | 2/1960 | Polzin | 235—92 |
| 2,956,745 | 10/1960 | Cromleigh | 235—92 |
| 3,072,883 | 1/1963 | Hendricks | 340—37 |
| 3,090,032 | 5/1963 | Shand | 340—41 |

NEIL C. READ, *Primary Examiner.*

THOMAS B. HABECKER, *Examiner.*